United States Patent [19]

Hunter

[11] 4,417,989

[45] Nov. 29, 1983

[54] PROPPING AGENT FOR FRACTURING FLUIDS

[75] Inventor: Walter D. Hunter, Houston, Tex.

[73] Assignee: Texaco Development Corp., White Plains, N.Y.

[21] Appl. No.: 289,559

[22] Filed: Aug. 3, 1981

Related U.S. Application Data

[60] Division of Ser. No. 142,550, Apr. 21, 1980, Pat. No. 4,326,969, which is a continuation-in-part of Ser. No. 953,375, Oct. 23, 1978, abandoned.

[51] Int. Cl.$^3$ .................... E21B 43/26; E21B 43/267
[52] U.S. Cl. .................... 252/8.55 R; 137/13; 166/280
[58] Field of Search ............ 252/8.55 R; 166/280, 166/308; 137/13

[56] References Cited

U.S. PATENT DOCUMENTS

| | | | |
|---|---|---|---|
| 2,808,397 | 10/1957 | Stroh et al. ................ | 525/385 X |
| 3,254,719 | 6/1966 | Root ........................... | 166/308 |
| 3,779,914 | 12/1973 | Nimerick ..................... | 252/8.55 |
| 3,865,190 | 2/1975 | Christopher et al. ......... | 252/8.55 X |
| 4,144,179 | 3/1979 | Chatterji ..................... | 252/8.55 |

*Primary Examiner*—Herbert B. Guynn
*Attorney, Agent, or Firm*—Robert A. Kulason; Walter D. Hunter; Richard A. Morgan

[57] ABSTRACT

Hydrocarbons are recovered from a subterranean hydrocarbon-bearing formation penetrated by an injection well and a production well by displacing hydrocarbons toward the production well using a drive fluid such as water thickened with polyacrylamide or partially hydrolyzed polyacrylamide or the sodium, potassium or ammonium salt thereof and a minor amount of polyacrylamide or partially hydrolyzed polyacrylamide or the sodium, potassium or ammonium salt thereof alkoxylated with an alkylene oxide. Optionally, the drive fluid can be saturated with carbon dioxide and/or natural gas at the injection pressure. An aqueous fracturing fluid containing a small amount of alkoxylated polyacrylamide or partially hydrolyzed polyacrylamide is also described.

2 Claims, No Drawings

PROPPING AGENT FOR FRACTURING FLUIDS

This is a division of application Ser. No. 142,550, filed Apr. 21, 1980, now U.S. Pat. No. 4,326,969, which is a continuation-in-part of application Ser. No. 953,375, filed Oct. 23, 1978, now abandoned.

BACKGROUND OF THE INVENTION

1. Field of the Invention

This invention relates to a process for recovering hydrocarbons from a subterranean hydrocarbon-bearing formation penetrated by an injection well and a production well wherein a drive fluid such as water thickened with (I) polyacrylamide or partially hydrolyzed polyacrylamide or the sodium, potassium or ammonium salt thereof and (II) a minor amount of polyacrylamide or partially hydrolyzed polyacrylamide or the sodium, potassium ammonium salt thereof alkoxylated with ethylene oxide or a mixture of ethylene oxide and propylene oxide is utilized to displace hydrocarbons in the formation toward a production well. In another aspect this invention relates to a method of fracturing a formation using an aqueous fluid containing a small amount of alkoxylated polyacrylamide or partially hydrolyzed polyacrylamide.

2. Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30–50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation; that is the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil, thus further reducing the already lowered formation oil volume and increasing the viscosity of the oil.

There is a definite need in the art for a water flooding process in which the disadvantages discussed above are largely eliminated or avoided.

SUMMARY OF THE INVENTION

This invention relates to a process for recovering hydrocarbons from a subterranean hydrocarbon-bearing formation penetrated by an injection well and a production well which comprises:

(A) injecting into the formation via an injection well a drive fluid comprising water having dissolved therein about 0.05 to about 5 weight percent of polyacrylamide or partially hydrolyzed polyacrylamide or the sodium, potassium or ammonium salt thereof and a minor amount of polyacrylamide or partially hydrolyzed polyacrylamide or the sodium, potassium or ammonium salt thereof alkoxylated with a material selected from the group consisting of (a) ethylene oxide or (b) a mixture of ethylene oxide and propylene oxide wherein the weight percent of ethylene oxide in the said mixture is from about 60 to about 95, (B) forcing the said fluid through the formation and (C) recovering hydrocarbons through the production well.

An additional embodiment of this invention relates to the driving fluid compositions utilized in step (A) which may be saturated with carbon dioxide and/or natural gas, if desired.

DETAILED DESCRIPTION OF THE INVENTION

Prior to practicing the process of this invention it is sometimes desirable to open up a communication path forcing a liquid such as water, oil or any other suitable hydrocarbon fraction into the formation at pressures of from about 300 to about 3000 psig which are sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferable that they be so oriented. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent particles having a Tyler mesh size of from about 8 to about 40 are preferred (i.e., from about 0.16 to about 0.093 inches).

Generally, the number average molecular weight of the polyacrylamide or partially hydrolyzed polyacrylamide or salts thereof utilized in this invention and of the alkoxylated polyacrylamide or partially hydrolyzed polyacrylamide or salts thereof will range from about 10,000 to about 2,000,000 or more. Polyacrylamide, partially hydrolyzed polyacrylamide or salts thereof which are manufactured and sold by a number of chemical manufacturers, are prepared by the usual vinyl compound polymerization methods.

The partially hydrolyzed polyacrylamides which are useful in preparing the ethoxylated, partially hydrolyzed polyacrylamides employed in the drive fluid of this invention consist of about 12 to about 67 mole percent of recurring units of the formulas:

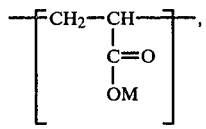

where M represents hydrogen, sodium, potassium or ammonium and about 33 to 88 mole percent of recurring units of the formula:

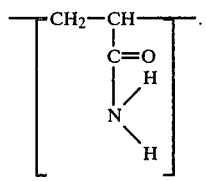

The preparation of such partially hydrolyzed polyacrylamides is well known in the art and is described in detail in U.S. Pat. Nos. 3,039,529; 3,002,960; 3,804,173, etc.

The alkoxylated polymers employed in the process of this invention comprise (1) polyacrylamide or (2) partially hydrolyzed polyacrylamide or the sodium, potassium or ammonium salt thereof alkoxylated with, i.e., reacted with, from about 2 to about 100 percent by weight of ethylene oxide or with a mixture of ethylene oxide and propylene oxide wherein the weight percent of ethylene oxide in the said mixture is about 60 to about 95. In another embodiment, alkoxylated polymers useful in the secondary recovery process of this invention are prepared by reacting polyacrylamide or polyacrylamide or partially hydrolyzed polyacrylamide with 2,3-epoxy-1-propanol (i.e., glycidol).

The alkoxylation of the acrylamide polymers, i.e., the reaction of these polymers with an alkylene oxide, can be conveniently conducted using methods well known in the art. For example, an aqueous solution comprising about 10 to about 30 weight percent or more of the acrylamide polymer in water along with about 0.5 weight percent or more of potassium hydroxide or sodium hydroxide is charged to an autoclave and the autoclave and contents heated to a temperature of about 125° to about 200° C. after which the required weight of ethylene oxide or a mixture of ethylene oxide and propylene oxide is pressured with nitrogen into the autoclave over a period of 1 to about 3 hours or more following which the autoclave is allowed to cool to room temperature and then vented. The reaction product remaining after being stripped to remove volatile materials yields the water-soluble, alkoxylated polymer.

A number of other methods are set out in the art for conducting such alkoxylation reactions including those described in U.S. Pat. Nos. 2,213,477; 2,233,381; 2,131,142; 2,808,397; 3,879,475; 2,174,761; 2,425,845; 3,062,747; 3,380,765 and German Offen. No. 2,021,066 of Nov. 11, 1971 (CA No. 76 86780b (1972)).

The following example which illustrates the preparation of the alkoxylated acrylamide polymers is to be considered not limitative.

EXAMPLE I

A total of 450 cc of water, 5 g. of powdered potassium hydroxide and 65 g. of polyacrylamide (number average molecular weight of about 250,000) are added to an autoclave which is then heated to a temperature of 125° C. Ethylene oxide in the amount of 40 g is added to the autoclave under nitrogen pressure over a 1.05 hour period during which time the temperature of the autoclave is maintained at 130° C. Next, the autoclave and contents are allowed to cool to room temperature after which the autoclave is vented. The reaction mixture is then stripped of volatiles using a nitrogen purge. The resulting water-soluble product is polyacrylamide alkoxylated with about 37 weight percent of ethylene oxide.

In the secondary recovery process of this invention, generally the aqueous drive fluid will contain from about 0.05 to about 5 weight percent or more of the polyacrylamide or partially hydrolyzed polyacrylamide or the sodium, potassium or ammonium salt thereof and from about 0.01 to about 2.0 weight percent of the alkoxylated polyacrylamide or partially hydrolyzed polyacrylamide or salts thereof. Optionally, the aqueous drive fluid may be saturated with carbon dioxide and/or natural gas at the injection pressure which generally will be from about 300 to about 3000 psig or more.

If desired, the aqueous drive fluid having dissolved therein the above-described polymeric thickening agent may be made alkaline by addition of an alkaline agent. The advantageous results achieved with the aqueous alkaline medium used in the process of this invention are believed to be derived from the wettability improving characteristics of the alkaline agent.

Useful alkaline agents include compounds selected from the group consisting of alkali metal hydroxides, alkaline earth metal hydroxides, and the basic salts of the alkali metal or alkaline earth metals which are capable of hydrolyzing in an aqueous medium to give an alkaline solution. The concentration of the alkaline agent employed in the drive fluid is generally from about 0.005 to about 0.3 weight percent. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, potassium hypochlorite, sodium carbonate and potassium carbonate.

A wide variety of surfactants such as linear alkylaryl sulfonates, alkyl polyethoxylated sulfates, etc. may also be included as a part of the aqueous drive fluid composition. Generally about 0.001 to about 1.0 or more weight percent of the surfactant will be included in the drive fluid.

This invention is best understood by reference to the following example which is offered only as an illustrative embodiment of this invention and is not intended to be limitative.

EXAMPLE II

In a field in which the primary production has already been exhausted, an injection well is completed in the hydrocarbon-bearing formation and perforations are formed between the interval of 3970–3985 feet. A production well is drilled approximately 410 feet distance from the injection well, and perforations are similarly made in the same hydrocarbon-bearing formation at 3975–3990 feet.

The hydrocarbon-bearing formation in both the injection well and the production well is hydraulically fractured using conventional techniques, and a gravel-sand mixture is injected into the fracture to hold it open and prevent healing of the fracture.

In the next step water saturated with carbon dioxide at 1200 psig at a temperature of 70° F. to which there has been added about 0.22 weight percent sodium hydroxide and containing dissolved therein 0.32 weight percent of a polyacrylamide having a number average molecular weight of about 135,000 and 0.12 weight percent of the sodium salt of partially hydrolyzed polyacrylamide having about 16 mole percent of the carboxamide groups originally present in the polyacrylamide hydrolyzed to carboxyl groups and having a number average molecular weight of 300,000 alkoxylated with about 13 weight percent of ethylene oxide in the manner previously described in Example I above is injected via the injection well into the formation at a pressure of about 1200 psig and at the rate of 0.95 barrel per minute. Injection of the driving fluid is continued at the rate of about 1 barrel per minute and at the end of 63 days the rate of production of oil is substantially greater than with water injection alone.

Another embodiment of this invention relates to a method of fracturing a fluid-bearing formation such as a hydrocarbon-bearing formation whereby artificial channels or fractures of high fluid conductivity within the formation can be formed. The pressure employed in the fracturing process may range from 500 to 10,000 psig or more (measured at the surface).

The method of this invention for fracturing a fluid-bearing formation penetrated by a well comprises injecting a viscous fracturing fluid down the well and into contact with the said fluid-bearing formation at a pressure and volume flow rate sufficient to fracture the said formation and wherein the viscous fracturing fluid comprises an aqueous solution of a water-soluble, high molecular weight, partially hydrolyzed polyacrylamide alkoxylated with an alkylene oxide and, optionally, a small amount of amorphous colloidal silica.

The novel viscous fracturing fluid comprises an aqueous base, which is preferably water, containing from about 0.01 to about 1.0 weight percent of a water-soluble, partially hydrolyzed polyacrylamide alkoxylated in the manner previously described above with about 2 to 100 weight percent or more of ethylene oxide or a mixture of ethylene oxide and propylene oxide wherein in the said mixture the weight percent of ethylene oxide is about 65 to about 95. If desired, the fracturing fluid may include suspended therein about 0.2 to about 4.8 pounds per gallon of a propping agent such as sand grains having a Tyler mesh size of about 8 to about 40. Further, the fracturing fluid may contain suspended therein about 0.05 to about 0.5 weight percent of amorphous colloidal silica having a particle size range of from about 7 to 15 millimicrons such as that sold by the Cabot Corp. of Boston, Mass. under the tradename CAB-O-SIL ®. Surfactants such as ethoxylated nonyl phenol, ec. can also be added to the fracturing fluid to increase the viscosity.

The number average molecular weight of the partially hydrolyzed polyacrylamides useful in preparing the alkoxylated polyacrylamides employed in the fracturing fluids of this invention will range from about 500,000 to about 2,000,000 or more. The partially hydrolyzed polyacrylamides utilized in forming the alkoxylated materials will have from about 12 to 67 mole percent of the original carboxamide groups hydrolyzed to carboxyl groups.

The fracturing method of this invention is illustrated by the following example which is to be considered not limitative.

EXAMPLE III

An oil bearing formation at 3440–3505 ft. composed primarily of limestone having good porosity (about 23%) contains a large quantity of oil (about 62% of the pore space) and adequate reservoir pressure (about 650 psi) but has a very low permeability (less than 1.1 millidarcies) and the productivity is about 4 bbls. oil per day.

The formation is fractured in 4 stages using conventional techniques for proportioning the fracture fluid into each set of perforations. The fracture fluid is water having 0.2 weight percent of partially hydrolyzed polyacrylamide having about 16 mole percent of the originally present carboxamide groups hydrolyzed to carboxyl groups and having a number average molecular weight of about 655,000 which provides a viscosity sufficient to permit a sand concentration of 3 lb./gal.

The formation is fractured using this fluid and sand (100,000 lbs. total). The sand size is:

| First 80,000 lb. | 20–40 mesh |
| --- | --- |
| Remaining 20,000 lb. | 10–12 mesh |

The well is placed on production and produces at a rate substantially above that experienced before the fracturing step was completed.

A substantial reduction in the friction loss in the fracturing process of this invention can be achieved when the proppants, such as sand grains, employed in the viscous aqueous fracturing fluid are coated with, for example, a thin film of polyacrylamide or partially hydrolyzed polyacrylamide in which about 12 to about 67 mole percent of the original carboxamide groups have been hydrolyzed to caboxyl groups, propoxylated with about 20 to about 100 weight percent of propylene oxide or a mixture of propylene oxide and ethylene oxide where the weight percent of propylene oxide in the mixture ranges from about 65 to about 95. The propoxylated polyacrylamides which are water insoluble can be prepared by methods well known in the art by reacting, for example, a propylene glycol of suitable molecular weight with the polyacrylamide in the presence of sodium hydroxide at a temperature of about 100° C. The number average molecular weight of the polyacrylamide or partially hydrolyzed polyacrylamide suitable for use in making the propoxylated materials will vary from about 200,000 to about 2,000,000 or more.

The thickness of the propoxylated polymer coating on the proppant needed will range from about 5 microns up to a preferred thickness about 0.001 inch to about 0.005 inch although a thickness more or less than set out in this range can be utilized, if desired.

In preparing polymer-coated, sand grains a solution of from 0.01 to about 1.5 percent or more by weight of the propoxylated polymer is first prepared by dissolving the polymer in ethyl alcohol, acetone or any other suitable solvent, at temperatures about 50° to about 100° C. Sand grains having a Tyler mesh size of about 8 to 40 are then added with stirring to the thus-prepared polymer solution after which the polymer-coated grains are separated from the solution and dried. In a specific illustration of the preparation of such polymer-coated sand grains a solution of 0.03 weight percent is formed by adding partially hydrolyzed polyacrylamide having about 16 mole percent of the carboxamide groups hydrolyzed to carboxyl groups alkoxylated with 32 weight percent of propylene oxide (number average molecular weight 650,000) with stirring to 1,000 gallons of ethyl alcohol at 70° C. A total of 2,000 lbs. of clean sand having a Tyler mesh size of 20 is added with vigorous mixing to the alcohol solution maintained at about 105° C. Mixing is continued for about 25 minutes after which the coated sand grains are recovered by filtration and then dried by tumbling in hot air at a temperature of about 160° F.

I claim:

1. A composition for use in fracturing fluids comprising sand grains having a Tyler mesh site of about 8 to about 40 coated with a thin film of polyacrylamide or partially hydrolyzed polyacrylamide of number average molecular weight from about 500,000 to about 2,000,000 alkoxylated with about 20 to about 100 weight percent of a material selected from the group consisting of propylene oxide and a mixture of propylene oxide and ethylene oxide wherein the weight percent of propylene oxide in the said mixture is about 65 to 95, wherein in the partially hydrolyzed polyacrylamide from 12 to 67 mole percent of the original carboxamide groups are hydrolyzed, said alkoxylated polyacrylamide or partially hydrolyzed polyacrylamide being water insoluble.

2. The composition of claim 1 wherein the thin film is alkoxylated, partially hydrolyzed polyacrylamide.

* * * * *